United States Patent Office 3,751,478
Patented Aug. 7, 1973

3,751,478
PREPARATION OF 1,2-CYCLOHEXANEDIONE
Michael A. Tobias, Edison, N.J., assignor to
Mobil Oil Corporation
No Drawing. Filed Sept. 8, 1970, Ser. No. 70,487
Int. Cl. C07c 49/27
U.S. Cl. 260—586 R                         2 Claims

ABSTRACT OF THE DISCLOSURE 2,3-epoxycyclohexanone is rearranged catalytically to 1,2-cyclohexanedione. Dehydrogenation of 1,2-cyclohexanedione produces catechols.

BACKGROUND OF THE INVENTION

Field of the invention

This invention is directed to catalytic rearrangement. It is more particularly concerned with the preparation of 1,2-cyclohexanedione.

Description of the prior art

No prior art has been found showing the catalytic reaction of this invention. In copending application Ser. No. 742,480, filed July 5, 1968, now U.S. Pat. No. 3,627,883 in the name of the present inventor M. A. Tobias, it was shown that 2,3-epoxycyclohexanone thermally rearranged to 1,3-cyclohexanedione (dihydroresorcinol).

SUMMARY OF THE INVENTION

This invention provides a process for producing 1,2-cyclohexanedione that comprises contacting 2,3-epoxycyclohexanone, in the vapor phase, in contact with acidic refractory catalysts at temperatures of between about 100° C. and about 400° C. at a LHSV of between about 0.01 and about 100.

DESCRIPTION OF SPECIFIC EMBODIMENTS

The 2,3-epoxycyclohexanone used in the process of this invention is well known in the art. It is readily prepared by reacting 2-cyclohexen-1-one with hydrogen peroxide or with t-butyl hydrogen peroxide (see U.S. Pat. 3,062,841).

Although the reaction can be carried out without using a carrier, it is more advantageous to admix 2,3-epoxycyclohexanone vapors with an inert carrier gas such as nitrogen, hydrogen, helium, argon and flue gas. In practice, the vapors are contacted in the vapor phase with an acidic refractory catalyst, preferably aluminum phosphate, which is used for purposes of illustration herein. Other catalyst, however, can be used such as silica-alumina, silica-zirconia and other phosphate salts including $Li_2HPO_4$, $LiH_2PO_4$, and $Na_2HPO_4$.

The process can be carried out at temperatures between about 100° C. and about 400° C., preferably at between about 200° C. and about 250° C. The contact time is readily expressed in terms of liquid hourly space velocity (LHSV), which can range between about 0.01 and about 100.

The process of this invention is more feasibly carried out by means of continuous process with recycling upon reacted material, but it may also be carried out batchwise. The process is readily carried out in standard reactors normally used in vapor phase reactants, such as tubular reactors constructed from metal such as stainless steel, heat resistant glass or refractory materials.

As has been indicated hereinbefore, the 1,2-cyclohexanedione is readily converted by dehydrogenation to catechol. Typically, this dehydrogenation can be carried out in the vapor phase contact with noble metal catalysts using the techniques and methods described in U.S. Pat. No. 3,335,152. Other vapor phase and liquid phase methods well known in the art can be used to convert the 1,2-cyclohexanedione to catechol.

EXAMPLE

A 12" x ⅝" stainless steel tube was filled with a 5" bed of ⅛" Aluminum Phosphate extrusions, insulated with asbestos, and placed into a small electric tube furnace. The furnace was heated so as to maintain the catalyst bed at 200° C., and a stream of nitrogen (flow rate 400 cc./min.) was passed through the reaction vessel.

Ten grams of 2,3-epoxycyclohexanone in 100 ml. of water was introduced (flow rate 1 cc./min.) into a preheater at the top of the furnace where it was mixed with nitrogen and carried into the reaction zone. The condensed aqueous effluent solution was saturated with sodium chloride, extracted with ether, and the combined extracts dried. Removal of the ether at reduced pressure afforded 9.3 g. of a mixture composed of 51.3% 1,2-cyclohexanedione, 44.5% of unconverted 2,3-epoxycyclohexanone, and 4.2% phenol.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A process for producing 1,2-cyclohexanedione that comprises contacting 2,3-epoxycyclohexanone, in the vapor phase, in contact with a silica-alumina, silica-zirconia, aluminum phosphate, $Li_2HPO_4$, $LiH_2PO_4$, or $Na_2HPO_4$ catalyst at temperatures of between about 100° C. and about 400° C. at a LHSV of between about 0.01 and about 100.
2. The process of claim 1, wherein said catalyst is aluminum phosphate.

References Cited

UNITED STATES PATENTS

| | | | |
|---|---|---|---|
| 3,560,571 | 2/1971 | Kropp | 260—586 R |
| 3,153,066 | 10/1964 | Werber | 260—586 R |
| 2,799,708 | 7/1957 | Oakley et al. | 260—586 RX |
| 3,009,959 | 11/1961 | Heath et al. | 260—586 RX |
| 3,538,164 | 11/1970 | Leffingwell | 260—586 RX |
| 3,151,167 | 9/1964 | Eisenmann et al. | 260—586 R |

LEON ZITVER, Primary Examiner
N. MORGENSTERN, Assistant Examiner